United States Patent [19]
Araya

[11] 3,784,260
[45] Jan. 8, 1974

[54] WHEEL RIM

[76] Inventor: Kumakichi Araya, No. 2, Daishoji Seki-machi, Kaga, Japan

[22] Filed: Nov. 12, 1971

[21] Appl. No.: 198,122

[30] Foreign Application Priority Data
Feb. 2, 1971 Japan.............................. 46/21796
Feb. 2, 1971 Japan.............................. 46/21795

[52] U.S. Cl. .................................... 301/97, 152/379
[51] Int. Cl. ............................................ B60b 21/10
[58] Field of Search...................... 301/97; 152/379, 152/381

[56] References Cited
UNITED STATES PATENTS
1,451,820  4/1923  Fry ........................................ 301/97
1,912,594  6/1933  Sauzedde ........................... 301/97 X
2,028,536  1/1936  Eksergian .............................. 301/97
2,083,326  6/1937  Eksergian ........................... 301/97 X
2,948,568  8/1960  Hykes ................................. 301/97 X FOREIGN PATENTS OR APPLICATIONS
275,223  6/1930  Italy ..................................... 301/97

Primary Examiner—Richard J. Johnson
Assistant Examiner—Reinhard J. Eisenzopf
Attorney—Richard K. Stevens et al.

[57] ABSTRACT

A wheel rim in which the top end of the horizontal tire carrying seat formed continuously with the curled flange portion is seam-welded to the shoulder which is bulged outwardly toward the inner tube.

3 Claims, 5 Drawing Figures

PATENTED JAN 8 1974　　3,784,260

WHEEL RIM

DESCRIPTION OF THE PRIOR ART

In the prior art, a wheel rim used primary for motorcycle, a tire carrying seat 2 formed continuously with a curled flange portion 1 is seam-welded to the arcuate shoulder 3 of the rim at its tip end 2t in radial cross-section of the rim as shown in FIG. 1. Then, a central concave portion 4 is shaped into predetermined configuration by means of suitable rolls. Further, the whole member is formed into annular rim which is complete for usage. And, when forming the rim, a seam-welded deposit $a$ connecting the tip end 2t of the tire carrying seat 2 to the rim plate is tapered toward the rim shoulder 3 which is produced while the central concave portion 4 is formed. The seam-welded deposit $a$ itself is bent into arcuate shape to coincide with curvilinear configuration of the shoulder 3. A tire may be easily fitted over the shoulder 3. However, since the tire carrying seat 2 is sloped downwardly to the central concave portion 4, the tire may frequently slip along or come off from the wheel rim. One reason for such situation is deemed to reside in that the tire is not securely fitted over the tire carrying seat 2, in other words, the width of the tire carrying seat 2 is not sufficiently large to hold the tire positively. To remedy the situation, the width of the tire carrying seat 2 will be increased until the tip end 2t is extended to the side wall of the central concave portion 4. However, it is not adequate measure for the situation since it will cause the overall width of the blank material for the wheel rim to be increased considerably. And, when an inner tube (not shown) is mounted within the tire the tip end 2t which may sometimes present a sharp edge will mar the inner tube. Moreover, it will hamper a drilling operation of spoke holes (not shown). Also, in case of wheel rims as shown in FIG. 2, wheel rims may be formed and machined much easier than those as shown in FIG. 1 and 3. However, the flange portion 11 may be oftentimes marred or broken by means of tool members which are used for fitting and removing of the tire. Moreover, since the flange is not sufficiently rigid, the whole rim may be twisted. If the plate thickness is increased to enhance the strength, it may cause the cost of material to be increased unduly, thus rendering the production of wheel rims uneconomical. Further, in case of wheel rims as shown in FIG. 3, the tip end 21b of the curled flange portion 21 is placed substantially perpendicular to the tire carrying seat 6 with a small gap c located between the tip end 21b and the tire carrying seat 6. For this reason, the wheel rim as shown in FIG. 3 is less effective than that as shown in FIG. 1 in terms of its rigidity. In addition, the wheel rim may be twisted similarly to that as shown in FIG. 2, and the wheel rim will be deformed while drilling the spoke holes, thereby rendering the working process impractical. Moreover, the curled flange portion 21 may be deformed when the inner tube is inflated at a level above the predetermined pressure after the tire having been fitted on. And the curled flange portion 21 may be marred by means of the tool when fitting or removing the tire or the tip end 21b of the curled flange portion 21 may be upset. Further, in case of the wheel rim as shown in FIG. 1, since the tire carrying seat 2 is transformed into the shoulder 3 in a smooth arcuate configuration and sloping downwardly into the central concave portion 4, the tire will come off easily from the tire carrying seat 2 of the wheel rim. The reason for this kind disadvantage is that the tip end 2t of the tire carrying seat 2 is covered by the tire and the width of the tire carrying seat 2 is held at a minimum so as to keep the welded deposit presenting a sharp edge away from the inner tube and meet with the standard dimension defining the shape of the wheel rim.

SUMMARY OF THE INVENTION

This invention relates to a wheel rim in which the tip end of the horizontal tire carrying seat formed continuously with the curled flange portion is seam-welded to the shoulder which is bulged outwardly toward the inner tube.

The object of this invention is to provide a wheel rim holding the tire securely while the vehicle is running without causing the rim to be removed, thereby enhancing the safety over the prior art wheel rims.

Another object of this invention is to provide a wheel rim which is durable, fabricated at small cost and adapted to a mass production.

Now preferrable embodiments according to this invention will be described in detail hereinafter by way of examples with reference to accompanying drawings.

DESCRIPTION OF THE PREFERRED EMBODIMENTS

Figure 4:
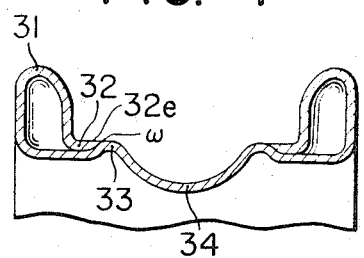
FIG. 4 is a vertical sectional view showing one embodiment of the wheel rim according to this invention.

Referring to FIG. 4, there is shown a first embodiment according to this invention in which the tip end 32e of the horizontal tire carrying seat 32 formed integrally with a curled flange portion 31 is seam-welded to a bulge portion 33 which is projecting upwardly in the drawing in curvilinear shape. The shoulder 33, together with the tire carrying seat 32, is integrally formed by suitable roll means so as to produce the tire carrying seat 32 of sufficiently large width. As shown in FIG. 4, the tip end 32e of the tire carrying seat 32 is made flush with top surface of the shoulder 33. Then, a central concave portion 34 is formed after the tip end 32e of the tire carrying seat 32 is seam-welded to the shoulder 33, thereby, producing a ring-shaped wheel rim of described size.

According to this invention, it is possible to obtain the wheel rim having a tire carrying seat of substatially large width, in contrast to prior art wheel rims. A tire can be closely fitted over a horizontal portion of the tire carrying seat, thereby preventing the tire from being slipped off or removed from the wheel rim while running and insuring safe operation at all times. Moreover, since the shoulder 33 is projection upwardly, the whole rim is reinforced in terms of its rigidity. Therefore, the wheel rim is rendered durable and fabriciated at small cost, since a considerable amount of time and labor will be saved during fabrication. Also, the wheel rim according to this invention is suitable for mass production.

Figure 1:
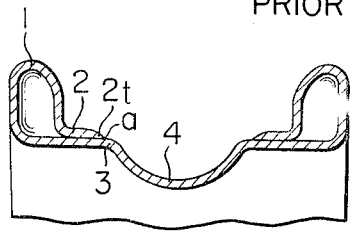
FIG. 1, 2 and 3 are respectively vertical sectional views showing the prior art wheel rims.
Figure 2:
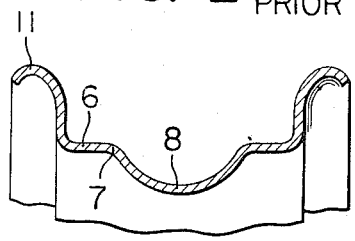
Figure 3:
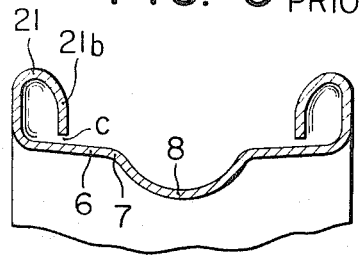
Figure 5:
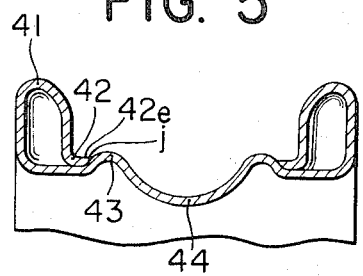
FIG. 5 is a vertical sectional view showing another embodiment of the wheel rim according to this invention.

Referring to FIG. 5 showing a second embodiment of the wheel rim according to this invention, the tip end 42e of the horizontal tire carrying seat 42 formed integrally with the curled flange portion 41 is seam-welded to the shoulder 43, which is projecting upwardly in curvilinear shape, in one side thereof. The shoulder 43 has a top surface thereof raised considerably above the level of the horizontal tire carrying seat 42. The tire will be fitted in between the curled flange portion 41 and the shoulder 43. Therefore, the tire will not come off easily from the wheel rim, unless a lateral force of large value is applied on the tire. The tire carrying seat 42 including the tip end 42e and the shoulder 43 will be worked out by suitable roll means after the welding of the tip end, while the central concave portion 44 is being formed, so as to obtain a wheel rim of desired configuration. With reference to FIG. 4 and 5, reference mark w and j denote respectively welded deposits. In FIG. 2 the reference numeral 7 denotes a shoulder. In FIG. 3 the reference numeral 8 denotes a concave portion.

According to this invention, the welded deposit j is completely protected by the shoulder 43 and covered by the edge portion of the tire, there will be no danger of marring the inner tube. Also, since the shoulder 43 is bulged upwardly above the level of the tire carrying seat 42, the tire will not be removed from the wheel rim after the tire is mounted on the wheel rim, thereby permitting the vehicle to be operated safely. As described in connection with the first embodiment, the strength of the wheel rim will be enhanced, and the wheel rim will become durable and fabricated in large numbers at a small cost, since a great deal of time and labor will be saved in the course of production, in case of the second embodiments.

It is possible to increase the friction between the tire and the wheel rim by applying a roulette or providing scores on the tire carrying seat when welding the tip end 32e of the tire carrying seat 32 formed integrally with the flange portion 31 to the shoulder 33 in the embodiment in FIG. 4 and when welding the tip end 42e of the tire carrying seat 42 formed integrally with the flang portion 41 to the shoulder 43 in the embodiment in FIG. 5, so as to prevent the tyre from being slipped away from the wheel rim.

What is claimed is:

1. A wheel rim comprising a curled flange portion having a straight vertical outer peripheral side and a tire carrying seat formed integrally with said flange portion extending horizontally to a shoulder portion, said shoulder portion being seam-welded to a convergent portion of the inner edge of said horizontal tire carrying seat and being projected outwardly a radial distance at least equal to the tire carrying seat.

2. A wheel rim comprising a curled flange portion having a straight vertical outer peripheral side and a tire carrying seat formed integrally with said flange portion extending horizontally to a shoulder portion, said shoulder portion being seam-welded to a convergent portion of the inner edge of said horizontal tire carrying seat and being projected outwardly to the radial distance of said tire carrying seat, both the said shoulder portion and said tire carrying seat when connected being horizontal.

3. A wheel rim comprising a curled flange portion having a straight vertical outer peripheral side and a tire carrying seat formed integrally with said flange portion extending horizontally to a shoulder portion, said shoulder portion being seam-welded to a convergent portion of the inner edge of said tire carrying seat and being projected outwardly a radial distance greater than said tire carrying seat.

* * * * *